F. W. Krause & G. W. Strong.
Mill.

No. 1566.
32,570.

Patented June 18, 1861.

WITNESSES

INVENTOR

UNITED STATES PATENT OFFICE.

FREDK. W. KRAUSE AND G. W. STRONG, OF CHICAGO, ILLINOIS.

GRINDING-MILL.

Specification of Letters Patent No. 32,570, dated June 18, 1861.

*To all whom it may concern:*

Be it known that we, FREDERICK W. KRAUSE and GEORGE W. STRONG, both of Chicago, in the county of Cook and State of Illinois, have invented a new and Improved Grinding-Mill; and we do hereby declare that the following is a full, clear, and exact description of the same, reference being had to the accompanying drawing, forming a part of this specification, in which—

Figure 1:
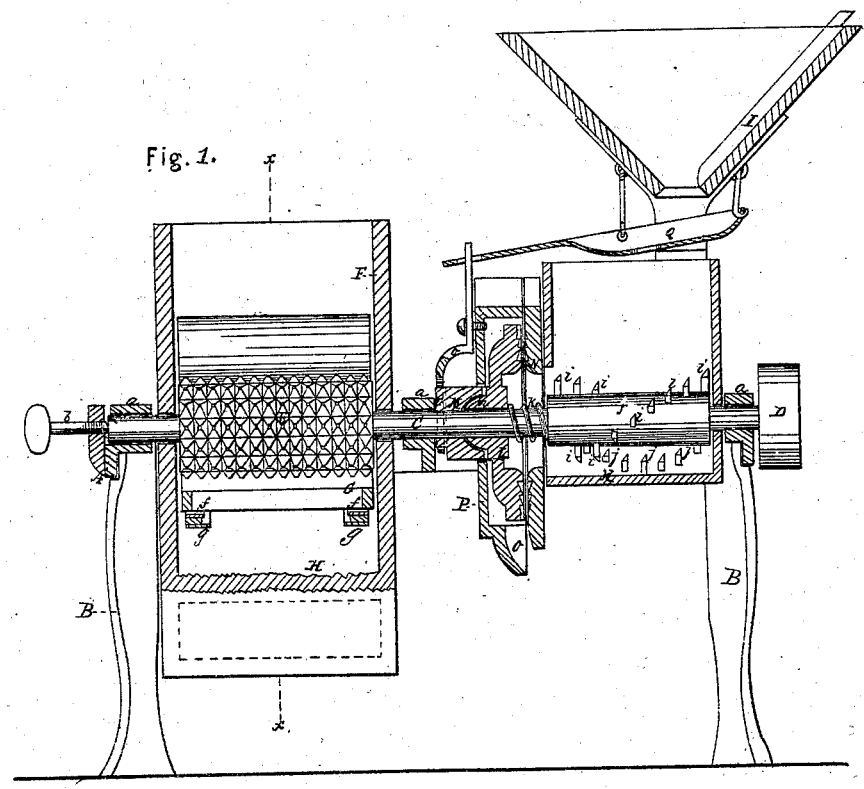
Figure 2:
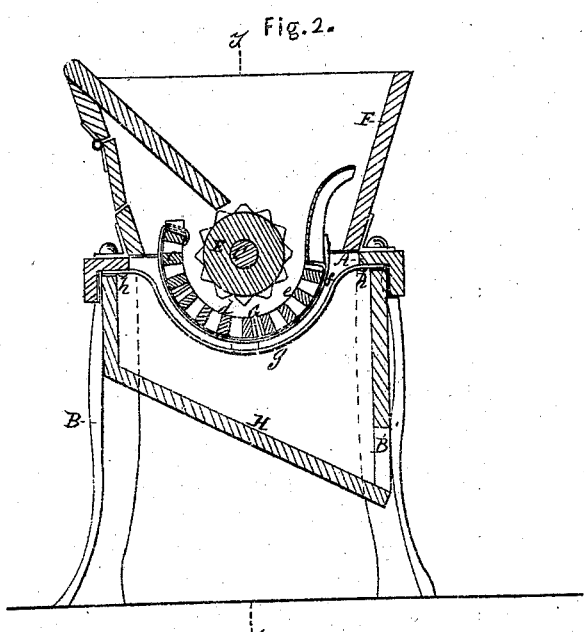
Figure 3:
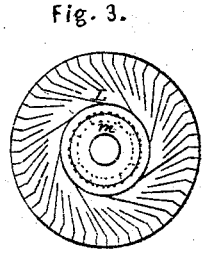
Figure 4:
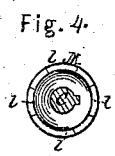

Figure 1, represents a longitudinal vertical section of our invention, the line $y$, $y$, Fig. 2, indicating the plane of section. Fig. 2, is a transverse vertical section taken in the plane indicated by the line $x$, $x$, Fig. 1. Fig. 3, is a face view of the grinding disk, detached. Fig. 4, is a detached front elevation of the clutch which we use for driving the grinding disk.

Similar letters of reference in all the figures indicate corresponding parts.

To enable those skilled in the art to make and use our invention we will proceed to describe its construction and operation with reference to the drawing.

A, represents a frame of cast iron or of any other suitable material supported by legs B. This frame forms the bearings for the horizontal shaft C, which runs in the journal boxes $a$, and which is driven by a pulley D, attached to one end of the same. A set screw $b$, serves to adjust this shaft in a longitudinal direction.

Secured to the shaft C, and near to one end of the same is the toothed cylinder E to which the ears of corn are fed through the hopper F, and which works in a concave G. This concave is slotted in a longitudinal direction and it consists of three parts $c$, $d$, $e$, which are united by means of springs $f$, that are connected to flat elastic pendants $g$, and these pendants are secured to the frame A, by means of screw bolts $h$. By these means the concave is made yielding and it adjusts itself according to the size and shape of the ears, so that by the action of the toothed cylinder and of the concave all the kernels are completely removed from the cobs.

The corn runs off over the inclined board H, under the concave and it is introduced through the hopper I, into the cracking and grinding device. The cracker consists of the cylinder J, with teeth $i$, placed spirally on its surface as clearly shown in Fig. 1. The points of these teeth are beveled off and they are brought down to sharp knife edges, which act against similar edges of the teeth $j$, in the concave or shell K. The teeth $j$ in this concave are also placed spirally, and the action of the teeth $i$, and of the teeth $j$, is such that the substance to be cracked is fed toward the grinding disk or runner L. This runner is placed loosely on the shaft C, and it is forced by means of a spiral spring $k$, against a cup shaped clutch M, which is firmly secured to the shaft and a detached front elevation of which is shown in Fig. 4. This clutch is provided with four (more or less) projections $l$, which fit into corresponding recesses in the back side of runner L, and a semi-spherical projection $m$, on the back side of said runner fits into the cup shaped portion of the clutch M, thus forming a sort of ball and socket joint, which gives to the runner a change to adjust itself in regard to the stationary disk N, as occasion may require.

The stationary disk N, is firmly secured to the frame A, and the grinding surfaces on this disk as well as on the runner are so arranged that they admit the cracked corn or grain on the inner or smallest diameter and reduce it to the required fineness toward the outer or largest diameter, and the meal or flour or other substance after having been reduced to the required state, is discharged through the spout O, at the under side of the shell P, which covers up the runner as clearly shown in Fig. 1.

The corn or grain or other substance to be ground is introduced to the cracking or grinding device through the hopper I, as above stated and from this hopper it drops on the trough Q, to which a shaking motion is imparted through the eccentric $n$, which actuates the vibrating lever $o$.

By thus arranging the cornsheller on the same shaft with the cracking and grinding devices, our mill is rendered particularly applicable for grinding corn and cobs together, for food of swine and neat cattle, but it can also be used with advantage for grinding corn or grain in a quick and superior manner. All the parts of our mill are made strong and in such a manner that the same do not easily get out of repair, and if the grinding disk or the runner or if any of the other working parts of our mill should become dull, or out of order it can easily be taken out and sharpened or repaired or replaced by a new piece.

Having thus fully described our invention what we claim as new and desire to secure by Letters Patent, is:

The arrangement on the same horizontal shaft C. of a toothed cylinder E. working in a jointed spring concave G. in combination with the self-feeding, spirally-toothed cracking cylinder J. self-adjusting runner L., a cup-shaped toothed clutch M. with a corresponding semi-spherical projection $m$, on the back of the runner L. constructed and operating as and for the purpose specified.

FREDERICK W. KRAUSE.
G. W. STRONG.

Witnesses:
DAVID PYOTT,
A. D. STURTEVANT.